(12) United States Patent  
Shimokawa et al.

(10) Patent No.: US 11,302,976 B2
(45) Date of Patent: Apr. 12, 2022

(54) PRESSURE-SENSITIVE ADHESIVE TAPE FOR BATTERY OUTER PACKAGING

(71) Applicant: NITTO DENKO CORPORATION, Ibaraki (JP)

(72) Inventors: Daisuke Shimokawa, Ibaraki (JP); Shigeki Kawabe, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 348 days.

(21) Appl. No.: 15/673,794

(22) Filed: Aug. 10, 2017

(65) Prior Publication Data

US 2018/0066162 A1 Mar. 8, 2018

(30) Foreign Application Priority Data

Sep. 6, 2016 (JP) .............................. JP2016-173639

(51) Int. Cl.
*H01M 50/124* (2021.01)
*C09J 7/38* (2018.01)
(Continued)

(52) U.S. Cl.
CPC ............. *H01M 50/124* (2021.01); *C09J 7/38* (2018.01); *C09J 7/385* (2018.01); *C09J 133/08* (2013.01);
(Continued)

(58) Field of Classification Search
CPC .. H01M 2/0287; H01M 50/124; C09J 133/08; C09J 2423/106
See application file for complete search history.

(56) References Cited

U.S. PATENT DOCUMENTS

| 9,755,207 B2 | 9/2017 | Kawabe et al. |
| 2004/0071962 A1 | 4/2004 | Tanimoto |

(Continued)

FOREIGN PATENT DOCUMENTS

| CN | 102746801 A | 10/2012 |
| CN | 103013366 A | 4/2013 |

(Continued)

OTHER PUBLICATIONS

Extended European Search Report dated Nov. 17, 2017, from European Patent Office in counterpart application No. 17001415.3.

(Continued)

*Primary Examiner* — Tong Guo
(74) *Attorney, Agent, or Firm* — Sughrue Mion, PLLC

(57) ABSTRACT

A pressure-sensitive adhesive tape for a battery outer packaging including: a base material; and a pressure-sensitive adhesive layer arranged on one surface of the base material, where a value calculated from an expression "a loss modulus of elasticity (G") of the pressure-sensitive adhesive tape for a battery outer packaging at 70° C.×a thickness (mm) of the pressure-sensitive adhesive layer/a thickness (mm) of the pressure-sensitive adhesive tape for a battery outer packaging" is $8 \times 10^3$ Pa or more; a value calculated from an expression "a storage modulus of elasticity (G') of the pressure-sensitive adhesive tape for a battery outer packaging at 23° C. ×the thickness (mm) of the pressure-sensitive adhesive layer/the thickness (mm) of the pressure-sensitive adhesive tape for a battery outer packaging" is $3 \times 10^5$ Pa or less; and a pressure-sensitive adhesive strength of the pressure-sensitive adhesive tape for a battery outer packaging to a stainless-steel plate at 23° C. is 2 N/10 mm or more.

6 Claims, 1 Drawing Sheet

(51) Int. Cl.
  *H01M 50/116* (2021.01)
  *H01M 50/183* (2021.01)
  *C09J 133/08* (2006.01)

(52) U.S. Cl.
  CPC ....... *H01M 50/116* (2021.01); *H01M 50/183* (2021.01); *C09J 2203/33* (2013.01); *C09J 2301/312* (2020.08); *C09J 2423/106* (2013.01); *C09J 2433/00* (2013.01); *C09J 2467/006* (2013.01); *C09J 2479/086* (2013.01); *C09J 2481/006* (2013.01)

(56) References Cited

U.S. PATENT DOCUMENTS

| | | | |
|---|---|---|---|
| 2010/0080991 A1* | 4/2010 | Kishioka | C09J 7/0217 428/355 R |
| 2012/0219835 A1 | 8/2012 | Kawabe et al. | |
| 2012/0270036 A1 | 10/2012 | Kiuchi et al. | |
| 2012/0270042 A1* | 10/2012 | Hanai | C09J 133/066 428/355 AC |
| 2013/0041093 A1 | 2/2013 | Nakayama et al. | |
| 2013/0071740 A1 | 3/2013 | Takamura et al. | |
| 2014/0295182 A1 | 10/2014 | Dong et al. | |
| 2014/0335391 A1* | 11/2014 | Kwon | H01M 50/183 429/94 |

FOREIGN PATENT DOCUMENTS

| | | |
|---|---|---|
| CN | 104073179 A | 10/2014 |
| EP | 2 784 140 A1 | 10/2014 |
| JP | 2000-173621 A | 6/2000 |
| JP | 2002-249736 A | 9/2002 |
| JP | 2008-205192 A | 9/2008 |
| JP | 2011-241328 A | 12/2011 |
| JP | 2012-184396 A | 9/2012 |
| JP | 2013-64086 A | 4/2013 |
| JP | 2013-140765 A | 7/2013 |
| JP | 2013-222526 A | 10/2013 |
| JP | 2014-152198 A | 8/2014 |
| JP | 2014-234444 A | 12/2014 |
| JP | 2016-125026 A | 7/2016 |
| KR | 10-2012-0119956 A | 11/2012 |

OTHER PUBLICATIONS

Notification of Reasons for Refusal dated Sep. 8, 2020, from the Japanese Patent Office in application No. 2016173639.

Notification of First Office Action dated Jan. 4, 2021 from the China National Intellectual Property Administration in CN Application No. 201710795284.1.

* cited by examiner

PRESSURE-SENSITIVE ADHESIVE TAPE FOR BATTERY OUTER PACKAGING This application claims priority under 35 U.S.C. Section 119 to Japanese Patent Application No. 2016-173639 filed on Sep. 6, 2016, which is herein incorporated by references.

BACKGROUND OF THE INVENTION

1. Field of the Invention

The present invention relates to a pressure-sensitive adhesive tape for a battery outer packaging.

2. Description of the Related Art

A battery, such as a nonaqueous secondary battery, is generally formed by storing an electrode and the like in an outer packaging body (e.g., a metal tube), and the outside of the outer packaging body is covered with a shrink tube or a predetermined film intended for the protection of the surface of the outer packaging body and the impartment of an insulating property thereto. Although the shrink tube is advantageous in that the tube is inexpensive, the tube is liable to extend in a corner portion in a rectangular battery, and hence involves a problem in terms of strength in the portion. In addition, the film is also inexpensive, but when the outer packaging body is covered with the film, a problem in a production process for the battery occurs. For example, the winding of the film needs to be stopped at an end portion thereof with a tape or the like, or the film itself is poor in handleability. Possible means for solving the problems is to use a pressure-sensitive adhesive tape instead of the shrink tube or the film, and hence a pressure-sensitive adhesive tape satisfying characteristics that are required when the tape is used in a battery outer packaging has been required.

The inventors of the present invention have found that when a related-art pressure-sensitive adhesive tape is used in the outer packaging of a battery as described above, such a problem as described below occurs. The tape shifts in its pressure-sensitive adhesive surface after its bonding to an adherend (e.g., the outer packaging body of the battery or the back surface of a pressure-sensitive adhesive tape at the time of overlap bonding), or when the battery protected with the pressure-sensitive adhesive tape is subjected to a salt water immersion test, liquid penetration is observed.

SUMMARY OF THE INVENTION

The present invention has been made to solve the conventional problems, and an object of the present invention is to provide a pressure-sensitive adhesive tape for a battery outer packaging having the following feature: the shift (adhesive shift) of the tape in its pressure-sensitive adhesive surface and liquid penetration when the tape is subjected to a salt water immersion test are prevented, and hence the tape is useful for the outer packaging of a battery.

A pressure-sensitive adhesive tape for a battery outer packaging according to one embodiment of the present invention includes: a base material; and a pressure-sensitive adhesive layer arranged on one surface of the base material, in which: a value calculated from an expression "a loss modulus of elasticity (G") of the pressure-sensitive adhesive tape for a battery outer packaging at 70° C.× a thickness (mm) of the pressure-sensitive adhesive layer/a thickness (mm) of the pressure-sensitive adhesive tape for a battery outer packaging" is $8 \times 10^3$ Pa or more; a value calculated from an expression "a storage modulus of elasticity (G') of the pressure-sensitive adhesive tape for a battery outer packaging at 23° C.× the thickness (mm) of the pressure-sensitive adhesive layer/the thickness (mm) of the pressure-sensitive adhesive tape for a battery outer packaging" is $3 \times 10^5$ Pa or less; and a pressure-sensitive adhesive strength of the pressure-sensitive adhesive tape for a battery outer packaging to a stainless-steel plate at 23° C. is 2 N/10 mm or more.

In one embodiment, a value calculated from an expression "a storage modulus of elasticity (G') of the pressure-sensitive adhesive tape for a battery outer packaging at 100° C.× the thickness (mm) of the pressure-sensitive adhesive layer/ the thickness (mm) of the pressure-sensitive adhesive tape for a battery outer packaging" is from $1 \times 10^4$ Pa to $15 \times 10^4$ Pa.

In one embodiment, a product of a tensile modulus of elasticity of the base material at 23° C. and a thickness of the base material is $3 \times 10^8$ Pa·mm or less.

In one embodiment, the pressure-sensitive adhesive tape for a battery outer packaging has a self-back surface pressure-sensitive adhesive strength at 23° C. of 1 N/10 mm or more.

In one embodiment, the pressure-sensitive adhesive layer contains an acrylic polymer as a base polymer.

In one embodiment, the acrylic polymer contains a constituent unit derived from a (meth)acrylic acid alkyl ester having 4 to 8 carbon atoms and a constituent unit derived from a monomer having an acidic functional group.

In one embodiment, a content ratio of the monomer having the acidic functional group is from 3 parts by weight to 8 parts by weight with respect to 100 parts by weight of the acrylic polymer.

According to the present invention, the pressure-sensitive adhesive tape for a battery outer packaging having the following feature can be provided: the shift (adhesive shift) of the tape in its pressure-sensitive adhesive surface and liquid penetration when the tape is subjected to a salt water immersion test are prevented, and hence the tape is useful for the outer packaging of a battery.

DESCRIPTION OF THE EMBODIMENTS

Figure 1:
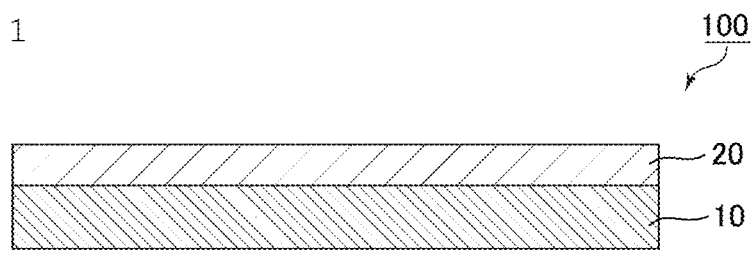
FIG. 1 is a schematic sectional view of a pressure-sensitive adhesive tape for a battery outer packaging according to one embodiment of the present invention.

A. Entire Construction of Pressure-Sensitive Adhesive Tape for Battery Outer Packaging FIG. 1 is a schematic sectional view of a pressure-sensitive adhesive tape for a battery outer packaging according to one embodiment of the present invention. A pressure-sensitive adhesive tape 100 for a battery outer packaging includes a base material 10, and a pressure-sensitive adhesive layer 20 arranged on one side of the base material 10.

Figure 2:
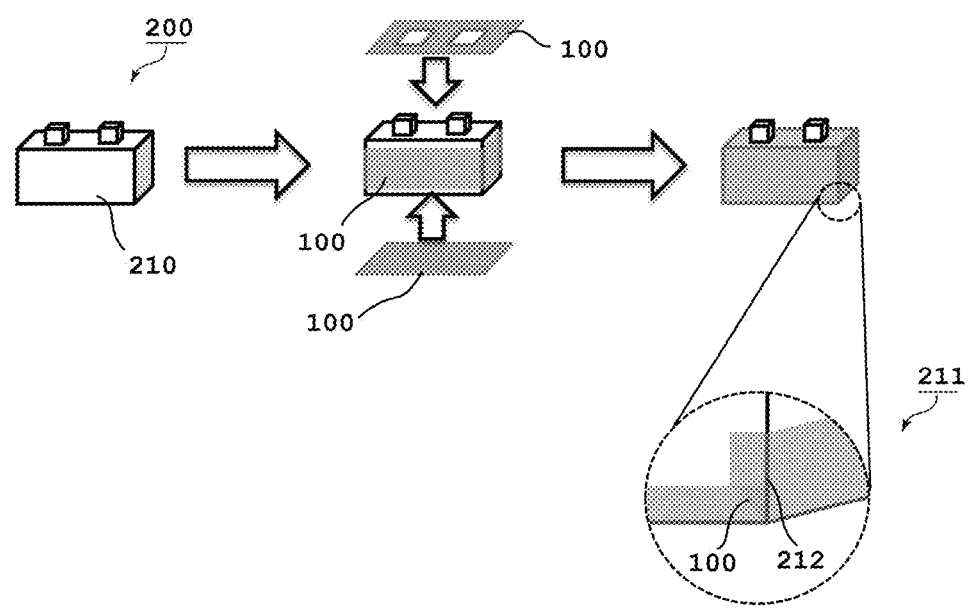
FIG. 2 is a view for illustrating the mode of the use of the pressure-sensitive adhesive tape for a battery outer packaging according to one embodiment of the present invention.

FIG. 2 is a view for illustrating the mode of the use of the pressure-sensitive adhesive tape for a battery outer packaging according to one embodiment of the present invention. In one embodiment, the pressure-sensitive adhesive tape 100 for a battery outer packaging of the present invention is bonded to the outer surface of an outer packaging body 210 of a battery 200, such as a nonaqueous secondary battery, to protect the battery 200. The pressure-sensitive adhesive tape 100 for a battery outer packaging can be bonded so as to cover the entirety of the outer surface of the outer packaging body 210. In one embodiment, the battery 200 is a rectangular battery. In the rectangular battery 200, the pressure-sensitive adhesive tapes 100 for battery outer packagings different from each other can be bonded to the outer periphery of its side surface, its upper surface, and its lower surface. In one embodiment, as in the illustrated example, the pressure-sensitive adhesive tapes 100 for battery outer packagings are bonded to the upper surface and the lower surface after the pressure-sensitive adhesive tape 100 for a battery outer packaging has been bonded to the outer periphery of the side surface. At this time, the end portions of the pressure-sensitive adhesive tapes 100 for battery outer packagings covering the upper surface and the lower surface are bent toward the side surface, and hence the pressure-sensitive adhesive tapes 100 for battery outer packagings overlap each other. An enlarged view 211 in FIG. 2 is an illustration of a state in which an end portion of the pressure-sensitive adhesive tape 100 for a battery outer packaging covering the lower surface is bent toward the side surface in a corner portion 211 of the battery 200. It should be noted that in the enlarged view 211, only the pressure-sensitive adhesive tape 100 for a battery outer packaging covering the lower surface is colored for easy viewing.

When the loss modulus of elasticity (G") of the pressure-sensitive adhesive layer of the pressure-sensitive adhesive tape for a battery outer packaging of the present invention at 70° C. and the storage modulus of elasticity (G') thereof at 23° C. are set within specific ranges (details about the foregoing are described later), a pressure-sensitive adhesive tape for a battery outer packaging having the following feature can be obtained: the shift (adhesive shift) of the pressure-sensitive adhesive tape for a battery outer packaging in its pressure-sensitive adhesive surface and liquid penetration when a battery having bonded thereto the tape is subjected to a salt water immersion test are prevented, and hence the tape is useful for the outer packaging of the battery. For example, when the pressure-sensitive adhesive tape 100 for a battery outer packaging is used in the outer packaging of the rectangular battery as illustrated in FIG. 2, the adhesive shift of an end portion of the tape near the corner portion 211 is prevented. In addition, when a battery is protected with a related-art pressure-sensitive adhesive tape and the battery is subjected to the salt water immersion test, the liquid penetration is observed in the portion 212 where the pressure-sensitive adhesive tape is bent. However, when the pressure-sensitive adhesive tape 100 for a battery outer packaging of the present invention is used, the liquid penetration is prevented and hence the salt water immersion test can be performed.

The pressure-sensitive adhesive strength of the pressure-sensitive adhesive tape for a battery outer packaging of the present invention to a stainless-steel plate at 23° C. is 2 N/10 mm or more, preferably from 2.2 N/10 mm to 20 N/10 mm, more preferably from 2.2 N/10 mm to 6 N/10 mm. When the pressure-sensitive adhesive strength falls within such range, a pressure-sensitive adhesive tape suitable for a battery outer packaging can be obtained. The term "pressure-sensitive adhesive strength" as used herein refers to a pressure-sensitive adhesive strength measured by a method in conformity with JIS Z 0237:2000, and the pressure-sensitive adhesive strength is measured by: reciprocating a 2-kilogram roller once to bond the pressure-sensitive adhesive tape to the stainless-steel plate; leaving the resultant to stand under 23° C. for 30 minutes; and then peeling the pressure-sensitive adhesive tape under the conditions of a peel angle of 180° and a peel rate (tensile rate) of 300 mm/min.

The self-back surface pressure-sensitive adhesive strength of the pressure-sensitive adhesive tape for a battery outer packaging of the present invention at 23° C. is preferably 0.8 N/10 mm or more, more preferably 1 N/10 mm or more, still more preferably from 1 N/10 mm to 10 N/10 mm, particularly preferably from 1 N/10 mm to 6 N/10 mm. The term "self-back surface pressure-sensitive adhesive strength" as used herein means the pressure-sensitive adhesive strength of the pressure-sensitive adhesive tape for a battery outer packaging to the back surface of the pressure-sensitive adhesive tape, i.e., the surface of the base material opposite to the pressure-sensitive adhesive layer. As described above, a portion where the pressure-sensitive adhesive tapes for battery outer packagings overlap each other occurs at the time of their use. Accordingly, when the self-back surface pressure-sensitive adhesive strength falls within the range, the effects of the present invention become more significant. The self-back surface pressure-sensitive adhesive strength can be adjusted by, for example, the composition of the pressure-sensitive adhesive of the pressure-sensitive adhesive layer, the kind of the base material, and the smoothness of the base material. In addition, the self-back surface pressure-sensitive adhesive strength can be increased by subjecting one surface of the base material to a treatment such as a corona treatment or a plasma treatment, or the self-back surface pressure-sensitive adhesive strength can be reduced by subjecting the surface to a treatment such as the application of a release agent.

The thickness of the pressure-sensitive adhesive tape for a battery outer packaging is preferably from 10 μm to 200 μm, more preferably from 20 μm to 150 μm, still more preferably from 30 μm to 100 μm.

B. Pressure-Sensitive Adhesive Layer

In the pressure-sensitive adhesive tape for a battery outer packaging of the present invention, a value represented by the following expression (1) is $8 \times 10^3$ Pa or more. When the value falls within such range, a pressure-sensitive adhesive tape for a battery outer packaging that is prevented from showing an adhesive shift and is hence useful for the outer packaging of a battery can be obtained.

The loss modulus of elasticity (G") of the pressure-sensitive adhesive tape for a battery outer packaging at 70° C.× the thickness (mm) of the pressure-sensitive adhesive layer/the thickness (mm) of the pressure-sensitive adhesive tape for a battery outer packaging (1)

The value represented by the expression (1) is a value calculated by multiplying the loss modulus of elasticity (G"), which is obtained by subjecting the pressure-sensitive adhesive tape for a battery outer packaging (base material/pressure-sensitive adhesive layer) to a modulus-of-elasticity test with a rotational rheometer, by the ratio of the thickness of the pressure-sensitive adhesive layer included in the pressure-sensitive adhesive tape for a battery outer packaging to the thickness of the pressure-sensitive adhesive tape for a battery outer packaging. In the pressure-sensitive adhesive tape for a battery outer packaging of the present invention, the loss modulus of elasticity (G") of the base material is much larger than the loss modulus of elasticity (G") of the pressure-sensitive adhesive layer, and hence the value represented by the expression (1) substantially corresponds to the loss modulus of elasticity (G") of the pressure-sensitive adhesive layer at 70° C.

The value calculated from the expression (1) is preferably from $8\times10^3$ Pa to $140\times10^3$ Pa, more preferably from $8.2\times10^3$ Pa to $130\times10^3$ Pa, still more preferably from $8.3\times10^3$ Pa to $40\times10^3$ Pa. When the value falls within such range, the effects of the present invention become more significant.

In the pressure-sensitive adhesive tape for a battery outer packaging of the present invention, a value represented by the following expression (2) is $3\times10^5$ Pa or less. When the value falls within such range, a pressure-sensitive adhesive tape for a battery outer packaging having the following feature can be obtained: liquid penetration when a battery having bonded thereto the pressure-sensitive adhesive tape for a battery outer packaging is subjected to a salt water immersion test can be prevented.

The storage modulus of elasticity (G') of the pressure-sensitive adhesive tape for a battery outer packaging at 23° C.× the thickness (mm) of the pressure-sensitive adhesive layer/the thickness (mm) of the pressure-sensitive adhesive tape for a battery outer packaging  (2)

In the pressure-sensitive adhesive tape for a battery outer packaging of the present invention, the storage modulus of elasticity (G') of the base material is much larger than the storage modulus of elasticity (G') of the pressure-sensitive adhesive layer, and hence the value represented by the expression (2) substantially corresponds to the storage modulus of elasticity (G') of the pressure-sensitive adhesive layer at 23° C.

The value calculated from the expression (2) is preferably from $0.1\times10^5$ Pa to $3\times10^5$ Pa, more preferably from $0.5\times10^5$ Pa to $2.5\times10^5$ Pa. When the value falls within such range, the effects of the present invention become more significant.

In the pressure-sensitive adhesive tape for a battery outer packaging of the present invention, a value represented by the following expression (3) is preferably from $1\times10^4$ Pa to $15\times10^4$ Pa, more preferably from $1\times10^4$ Pa to $12\times10^4$ Pa, still more preferably from $1\times10^4$ Pa to $5\times10^4$ Pa. When the value falls within such range, a liquid penetration-preventing effect becomes more significant.

The storage modulus of elasticity (G') of the pressure-sensitive adhesive tape for a battery outer packaging at 100° C.× the thickness (mm) of the pressure-sensitive adhesive layer/the thickness (mm) of the pressure-sensitive adhesive tape for a battery outer packaging  (3)

The thickness of the pressure-sensitive adhesive layer is preferably from 10 μm to 100 μm, more preferably from 15 μm to 50 μm, still more preferably from 15 μm to 40 μm.

The pressure-sensitive adhesive layer contains a base polymer. Any appropriate polymer is used as the base polymer as long as the effects of the present invention are obtained. Examples of the base polymer include an acrylic polymer, a silicone-based polymer, a rubber-based polymer, and a urethane-based polymer.

The acrylic polymer is preferably used as the base polymer. The acrylic polymer is, for example, an acrylic polymer containing one or two or more kinds of constituent units each derived from a (meth)acrylic acid alkyl ester.

The content ratio of the constituent unit derived from the (meth)acrylic acid alkyl ester is preferably from 50 parts by weight to 97 parts by weight, more preferably from 70 parts by weight to 92 parts by weight with respect to 100 parts by weight of the base polymer.

The (meth)acrylic acid alkyl ester preferably has a linear or branched alkyl group having 1 to 24 (more preferably 3 to 20, still more preferably 4 to 12, particularly preferably 4 to 8) carbon atoms.

Examples of the (meth)acrylic acid alkyl ester include methyl (meth)acrylate, ethyl (meth)acrylate, propyl (meth)acrylate, butyl (meth)acrylate, pentyl (meth)acrylate, hexyl (meth)acrylate, heptyl (meth)acrylate, octyl (meth)acrylate, nonyl (meth)acrylate, decyl (meth)acrylate, and eicosyl (meth)acrylate.

In one embodiment, a (meth)acrylic acid alkyl ester having a branched alkyl group is used as the (meth)acrylic acid alkyl ester. When the (meth)acrylic acid alkyl ester having a branched alkyl group is used, a pressure-sensitive adhesive tape for a battery outer packaging into which a liquid hardly penetrates can be obtained. The number of carbon atoms of the branched alkyl group is preferably from 4 to 24, more preferably from 4 to 18, still more preferably from 4 to 8. The (meth)acrylic acid alkyl ester having a linear alkyl group and the (meth)acrylic acid alkyl ester having a branched alkyl group may also be used in combination. In addition, the (meth)acrylic acid alkyl ester having a branched alkyl group may be used alone as the (meth)acrylic acid alkyl ester.

In one embodiment, the content ratio of a constituent unit derived from the (meth)acrylic acid alkyl ester having a branched alkyl group in the base polymer is from 50 parts by weight to 100 parts by weight with respect to 100 parts by weight of the constituent unit derived from the (meth)acrylic acid alkyl ester (i.e., a total amount of 100 parts by weight of the (meth)acrylic acid alkyl ester having a linear alkyl group and the (meth)acrylic acid alkyl ester having a branched alkyl group).

Examples of the (meth)acrylic acid alkyl ester having a branched alkyl group include isobutyl (meth)acrylate, s-butyl (meth)acrylate, t-butyl (meth)acrylate, 2-ethylhexyl (meth)acrylate, isooctyl (meth)acrylate, isononyl (meth)acrylate, isodecyl (meth)acrylate, 2-ethylbutyl (meth)acrylate, and 2-methylbutyl (meth)acrylate. Of those, 2-ethylhexyl (meth)acrylate, isooctyl (meth)acrylate, isononyl (meth)acrylate, and isodecyl (meth)acrylate are preferred, and 2-ethylhexyl (meth)acrylate is more preferred. A homopolymer of 2-ethylhexyl (meth)acrylate has a low glass transition temperature. The use of such 2-ethylhexyl acrylate provides an acrylic polymer excellent in flexibility. As a result, a pressure-sensitive adhesive layer excellent in adhesiveness with an adherend is formed, and hence a pressure-sensitive adhesive tape for a battery outer packaging into which a liquid hardly penetrates can be obtained.

In one embodiment, an acrylic polymer using the (meth)acrylic acid alkyl ester as a main monomer, the polymer containing the main monomer and a monomer having an acidic functional group, is used. Examples of the monomer having an acidic functional group include a carboxyl group-containing monomer, an acid anhydride group-containing monomer, a phosphoric acid group-containing monomer, and a sulfonic acid group-containing monomer. Of those, a carboxyl group-containing monomer is preferred. The use of the carboxyl group-containing monomer easily expresses an adhesive strength to a metal plate serving as an adherend of this application, and provides the following features in terms of design and production: the monomer easily copolymerizes with any other acrylic monomer; and a polymer produced by the copolymerization is easily cross-linked.

Examples of the carboxyl group-containing monomer include (meth)acrylic acid, carboxyethyl acrylate, carboxypentyl acrylate, itaconic acid, maleic acid, fumaric acid, and crotonic acid. Of those, acrylic acid is preferred. The use of acrylic acid provides an acrylic polymer excellent in flexibility. As a result, a pressure-sensitive adhesive layer excellent in adhesiveness with an adherend is formed, and hence a pressure-sensitive adhesive tape for a battery outer packaging into which a liquid hardly penetrates can be obtained.

The content ratio of a constituent unit derived from the monomer having an acidic functional group is preferably from 2 parts by weight to 20 parts by weight, more preferably from 3 parts by weight to 10 parts by weight, still more preferably from 3 parts by weight to 8 parts by weight with respect to 100 parts by weight of the base polymer.

In one embodiment, the base polymer (acrylic polymer) contains a constituent unit derived from a (meth)acrylic acid alkyl ester having 4 to 8 carbon atoms (preferably the (meth)acrylic acid alkyl ester having a branched alkyl group, more preferably 2-ethylhexyl acrylate) serving as the main monomer and the constituent unit derived from the monomer having an acidic functional group (preferably acrylic acid). In this embodiment, the content ratio of the constituent unit derived from the monomer having an acidic functional group is preferably from 2 parts by weight to 20 parts by weight, more preferably from 3 parts by weight to 10 parts by weight, still more preferably from 3 parts by weight to 8 parts by weight with respect to 100 parts by weight of the base polymer.

The base polymer (acrylic polymer) may contain a constituent unit derived from any other monomer copolymerizable with the (meth)acrylic acid alkyl ester and/or the monomer having an acidic functional group as required for the purpose of modification of a cohesive strength, heat resistance, a cross-linking property, or the like. Examples of such other monomer include: hydroxyl group-containing monomers, such as hydroxyethyl (meth)acrylate, hydroxypropyl (meth)acrylate, hydroxybutyl (meth)acrylate, hydroxyhexyl (meth)acrylate, hydroxyoctyl (meth)acrylate, hydroxydecyl (meth)acrylate, hydroxylauryl (meth)acrylate, and (4-hydroxymethylcyclohexyl)methyl methacrylate; (N-substituted) amide-based monomers, such as (meth)acrylamide, N,N-dimethyl(meth)acrylamide, N-butyl(meth)acrylamide, N-methylol(meth)acrylamide, and N-methylolpropane(meth)acrylamide; aminoalkyl (meth)acrylate-based monomers, such as aminoethyl (meth)acrylate, N,N-dimethylaminoethyl (meth)acrylate, and t-butylaminoethyl (meth)acrylate; alkoxyalkyl (meth)acrylate-based monomers, such as methoxyethyl (meth)acrylate and ethoxyethyl (meth)acrylate; maleimide-based monomers, such as N-cyclohexylmaleimide, N-isopropylmaleimide, N-laurylmaleimide, and N-phenylmaleimide; itaconimide-based monomers, such as N-methylitaconimide, N-ethylitaconimide, N-butylitaconimide, N-octylitaconimide, N-2-ethylhexylitaconimide, N-cyclohexylitaconimide, and N-laurylitaconimide; succinimide-based monomers, such as N-(meth)acryloyloxymethylenesuccinimide, N-(meth)acryloyl-6-oxyhexamethylenesuccinimide, and N-(meth)acryloyl-8-oxyoctamethylenesuccinimide; vinyl-based monomers, such as vinyl acetate, vinyl propionate, N-vinylpyrrolidone, methylvinylpyrrolidone, vinylpyridine, vinylpiperidone, vinylpyrimidine, vinylpiperazine, vinylpyrazine, vinylpyrrole, vinylimidazole, vinyloxazole, vinylmorpholine, N-vinylcarboxylic acid amides, styrene, α-methylstyrene, and N-vinylcaprolactam; cyanoacrylate monomers, such as acrylonitrile and methacrylonitrile; epoxy group-containing acrylic monomers, such as glycidyl (meth)acrylate; glycol-based acrylic ester monomers, such as polyethylene glycol (meth)acrylate, polypropylene glycol (meth)acrylate, methoxyethylene glycol (meth)acrylate, and methoxypolypropylene glycol (meth)acrylate; acrylic acid ester-based monomers each having a heterocyclic ring, a halogen atom, a silicon atom, or the like, such as tetrahydrofurfuryl (meth)acrylate, fluorine (meth)acrylate, and silicone (meth)acrylate; polyfunctional monomers, such as hexanediol di(meth)acrylate, (poly)ethylene glycol di(meth)acrylate, (poly)propylene glycol di(meth)acrylate, neopentyl glycol di(meth)acrylate, pentaerythritol di(meth)acrylate, trimethylolpropane tri(meth)acrylate, pentaerythritol tri(meth)acrylate, dipentaerythritol hexa(meth)acrylate, epoxy acrylate, polyester acrylate, and urethane acrylate; olefin-based monomers, such as isoprene, butadiene, and isobutylene; and vinyl ether-based monomers, such as vinyl ether. Those monomer components may be used alone or in combination thereof.

The content ratio of the constituent unit derived from the other monomer is preferably 20 parts by weight or less, more preferably 15 parts by weight or less, still more preferably from 1 part by weight to 10 parts by weight with respect to 100 parts by weight of the base polymer.

The weight-average molecular weight of the base polymer is preferably from 300,000 to 2,000,000, more preferably from 500,000 to 1,500,000. The weight-average molecular weight can be measured by GPC (solvent: THF).

The pressure-sensitive adhesive layer may contain any appropriate additive as required. Examples of the additive include a cross-linking agent, a tackifier, a plasticizer (e.g., a trimellitic acid ester-based plasticizer or a pyromellitic acid ester-based plasticizer), a pigment, a dye, a filler, an age resistor, a conductive material, a UV absorber, a light stabilizer, a release modifier, a softener, a surfactant, a flame retardant, an antioxidant, and a solvent.

Any appropriate tackifier is used as the tackifier. For example, a tackifying resin is used as the tackifier. Specific examples of the tackifying resin include: a rosin-based tackifying resin (e.g., unmodified rosin, modified rosin, a rosin phenol-based resin, or a rosin ester-based rosin); a terpene-based tackifying resin (e.g., a terpene-based resin, a terpene phenol-based resin, a styrene-modified terpene-based resin, an aromatic modified terpene-based resin, or a hydrogenated terpene-based resin); a hydrocarbon-based tackifying resin (e.g., an aliphatic hydrocarbon resin, an aliphatic cyclic hydrocarbon resin, an aromatic hydrocarbon resin (e.g., a styrene-based resin or a xylene-based resin), an aliphatic-aromatic petroleum resin, an aliphatic-alicyclic petroleum resin, a hydrogenated hydrocarbon resin, a coumarone-based resin, or a coumarone-indene-based resin); a phenol-based tackifying resin (e.g., an alkylphenol-based resin, a xylene-formaldehyde-based resin, resol, or novolac); a ketone-based tackifying resin; a polyamide-based tackifying resin; an epoxy-based tackifying resin; and an elastomer-based tackifying resin.

The softening point of the tackifier is preferably from 70° C. to 200° C., more preferably from 80° C. to 190° C. When the softening point falls within such range, a pressure-sensitive adhesive layer whose storage modulus of elasticity and loss modulus of elasticity have been appropriately adjusted can be obtained.

Examples of the cross-linking agent include an isocyanate-based cross-linking agent, an epoxy-based cross-linking agent, a melamine-based cross-linking agent, and a peroxide-based cross-linking agent. In addition to the foregoing, the examples further include a urea-based cross-linking agent, a metal alkoxide-based cross-linking agent, a metal chelate-based cross-linking agent, a metal salt-based cross-linking agent, a carbodiimide-based cross-linking agent, an oxazoline-based cross-linking agent, an aziridinebased cross-linking agent, and an amine-based cross-linking agent. Of those, an isocyanate-based cross-linking agent or an epoxy-based cross-linking agent is preferred.

Specific examples of the isocyanate-based cross-linking agent include: lower aliphatic polyisocyanates, such as butylene diisocyanate and hexamethylene diisocyanate; alicyclic isocyanates, such as cyclopentylene diisocyanate, cyclohexylene diisocyanate, and isophorone diisocyanate; aromatic isocyanates, such as 2,4-tolylene diisocyanate, 4,4'-diphenylmethane diisocyanate, and xylylene diisocyanate; isocyanate adducts, such as a trimethylolpropane/tolylene diisocyanate trimer adduct (manufactured by Nippon Polyurethane Industry Co., Ltd., product name: "CORONATE L"), a trimethylolpropane/hexamethylene diisocyanate trimer adduct (manufactured by Nippon Polyurethane Industry Co., Ltd., product name: "CORONATE HL"), and an isocyanurate form of hexamethylene diisocyanate (manufactured by Nippon Polyurethane Industry Co., Ltd., product name: "CORONATE HX"). The content of the isocyanate-based cross-linking agent may be set to any appropriate amount in accordance with a desired pressure-sensitive adhesive strength and a desired modulus of elasticity, and is typically from 0.1 part by weight to 20 parts by weight, more preferably from 0.5 part by weight to 10 parts by weight with respect to 100 parts by weight of the base polymer.

Examples of the epoxy-based cross-linking agent include N,N,N',N'-tetraglycidyl-m-xylenediamine, diglycidylaniline, 1,3-bis(N,N-glycidylaminomethyl)cyclohexane (manufactured by Mitsubishi Gas Chemical Company, Inc., product name: "TETRAD-C"), 1,6-hexanediol diglycidyl ether (manufactured by Kyoeisha Chemical Co., Ltd., product name: "Epolite 1600"), neopentyl glycol diglycidyl ether (manufactured by Kyoeisha Chemical Co., Ltd., product name: "Epolite 1500NP"), ethylene glycol diglycidyl ether (manufactured by Kyoeisha Chemical Co., Ltd., product name: "Epolite 40E"), propylene glycol diglycidyl ether (manufactured by Kyoeisha Chemical Co., Ltd., product name: "Epolite 70P"), polyethylene glycol diglycidyl ether (manufactured by NOF Corporation, product name: "EPIOL E-400"), polypropylene glycol diglycidyl ether (manufactured by NOF Corporation, product name: "EPIOL P-200"), sorbitol polyglycidyl ether (manufactured by Nagase ChemteX Corporation, product name: "DENACOL EX-611"), glycerol polyglycidyl ether (manufactured by Nagase ChemteX Corporation, product name: "DENACOL EX-314"), pentaerythritol polyglycidyl ether, polyglycerol polyglycidyl ether (manufactured by Nagase ChemteX Corporation, product name: "DENACOL EX-512"), sorbitan polyglycidyl ether, trimethylolpropane polyglycidyl ether, adipic acid diglycidyl ester, o-phthalic acid diglycidyl ester, triglycidyl-tris(2-hydroxyethyl)isocyanurate, resorcin diglycidyl ether, bisphenol-S-diglycidyl ether, and an epoxy-based resin having two or more epoxy groups in a molecule. The content of the epoxy-based cross-linking agent may be set to any appropriate amount in accordance with a desired pressure-sensitive adhesive strength and a desired modulus of elasticity, and is typically from 0.01 part by weight to 10 parts by weight, more preferably from 0.03 part by weight to 5 parts by weight with respect to 100 parts by weight of the base polymer.

C. Base Material

A resin film is preferably used as the base material. Examples of a resin for forming the resin film include: polyester-based resins, such as polyethylene terephthalate (PET); polyolefin-based resins, such as polypropylene (PP); polyimide (PI); polyether imide (PEI); polyphenylene sulfide (PPS); polysulfone (PSF); polyether ether ketone (PEEK); and polyarylate (PAR). Of those, polyester-based resins, such as polyethylene terephthalate (PET), polyolefin-based resins, such as polypropylene (PP), and polyimide (PI) are preferred from the viewpoints of heat resistance and an insulating property.

The thickness of the base material is preferably from 12 μm to 100 μm, more preferably from 12 μm to 75 μm, still more preferably from 25 μm to 50 μm. When the thickness falls within such range, a pressure-sensitive adhesive tape for a battery outer packaging that shows a small stress in a bent portion and hardly peels in a corner portion can be obtained. In addition, a pressure-sensitive adhesive tape for a battery outer packaging having an insulating property and a strength that are suitable for a battery outer packaging can be obtained.

The tensile modulus of elasticity of the base material at 23° C. is preferably from $0.5 \times 10^9$ Pa to $10 \times 10^9$ Pa, more preferably from $1 \times 10^9$ Pa to $8 \times 10^9$ Pa, still more preferably from $3 \times 10^9$ Pa to $6 \times 10^9$ Pa. When the tensile modulus of elasticity falls within such range, a pressure-sensitive adhesive tape for a battery outer packaging that shows a small stress at the time of its bending and hardly peels in a corner portion can be obtained. In addition, a pressure-sensitive adhesive tape for a battery outer packaging that can significantly prevent liquid penetration can be obtained. The tensile modulus of elasticity can be measured in conformity with JIS K 7161:2008.

The product of the tensile modulus of elasticity of the base material at 23° C. and the thickness of the base material is preferably $4 \times 10^8$ Pa·mm or less, more preferably $3 \times 10^8$ Pa·mm or less, still more preferably from $0.5 \times 10^8$ Pa·mm to $2 \times 10^8$ Pa·mm. When the product falls within such range, a pressure-sensitive adhesive tape for a battery outer packaging that shows a small stress at the time of its bending and hardly peels in a corner portion can be obtained. In addition, a pressure-sensitive adhesive tape for a battery outer packaging that can significantly prevent liquid penetration can be obtained.

The pressure-sensitive adhesive tape of the present invention may be produced by any appropriate method. For example, the tape can be formed by applying a composition containing the base polymer and an additive to be added as required to the base material, and then drying the composition. In addition, after the pressure-sensitive adhesive layer has been formed on another support, the pressure-sensitive adhesive layer may be transferred onto the base material.

Now, the present invention is specifically described by way of Examples. However, the present invention is by no means limited to these Examples. Evaluation methods in Examples are as described below. In addition, in Examples, the terms "part(s)" and "%" are by weight, unless otherwise stated.

(1) Measurement of Loss Modulus of Elasticity (G") and Storage Modulus of Elasticity (G')

A laminate of pressure-sensitive adhesive tapes for battery outer packagings (thickness: 3 mm, diameter: 8 mm) was used as a sample, and the loss modulus of elasticity (G") of the sample at 70° C., and the storage moduli of elasticity (G') thereof at 23° C. and 100° C. were measured with a dynamic viscoelasticity-measuring apparatus (manufactured by TA Instruments, product name: "ARES-G2"). The measurement was performed at a measurement frequency of 1 Hz, a strain of 0.1%, and a rate of temperature increase of 5° C./min (from −50° C. to 120° C.)

The loss modulus of elasticity (G") of a pressure-sensitive adhesive layer at 70° C., the storage modulus of elasticity (G') of the pressure-sensitive adhesive layer at 23° C., and the storage modulus of elasticity (G') of the pressure-sensitive adhesive layer at 100° C. were determined by multiplying the measured values by the ratio (thickness of the pressure-sensitive adhesive layer/thickness of the pressure-sensitive adhesive tape for a battery outer packaging).

(2) Tensile Modulus of Elasticity of Base Material

A base material (width: 5 mm) used in a pressure-sensitive adhesive tape for a battery outer packaging was used as a sample, and the tensile modulus of elasticity of the sample at 23° C. was measured with a dynamic viscoelasticity-measuring apparatus (manufactured by TA Instruments, product name: "RSA-3"). The measurement was performed at a chuck-to-chuck distance of 20 mm, a measurement frequency of 1 Hz, an initial strain of 0.05%, and a rate of temperature increase of 5° C./min (from 0° C. to 100° C.)

(3) Pressure-Sensitive Adhesive Strength

A pressure-sensitive adhesive strength was measured in conformity with JIS-Z-0237 (2000).

The pressure-sensitive adhesive layer surface of a pressure-sensitive adhesive tape for a battery outer packaging (measuring 10 mm wide by 120 mm long) and a stainless-steel plate were bonded to each other, and a 2-kilogram roller was reciprocated once to crimp the surface and the plate together. After a lapse of 30 minutes under an environment at 23° C., the pressure-sensitive adhesive strength of the pressure-sensitive adhesive tape for a battery outer packaging was measured at a tensile rate of 300 mm/min and a peel angle of 180°.

(4) Self-Back Surface Pressure-Sensitive Adhesive Strength

The pressure-sensitive adhesive layer surface of a pressure-sensitive adhesive tape A for a battery outer packaging (measuring 10 mm wide by 120 mm long) and the base material surface (surface opposite to the pressure-sensitive adhesive layer) of another pressure-sensitive adhesive tape A for a battery outer packaging bonded to a stainless-steel plate were bonded to each other, and a 2-kilogram roller was reciprocated once to crimp the surfaces together. After a lapse of 30 minutes under an environment at 23° C., the self-back surface pressure-sensitive adhesive strength of the pressure-sensitive adhesive tape for a battery outer packaging was measured at a tensile rate of 300 mm/min and a peel angle of 180°.

Figure 3:
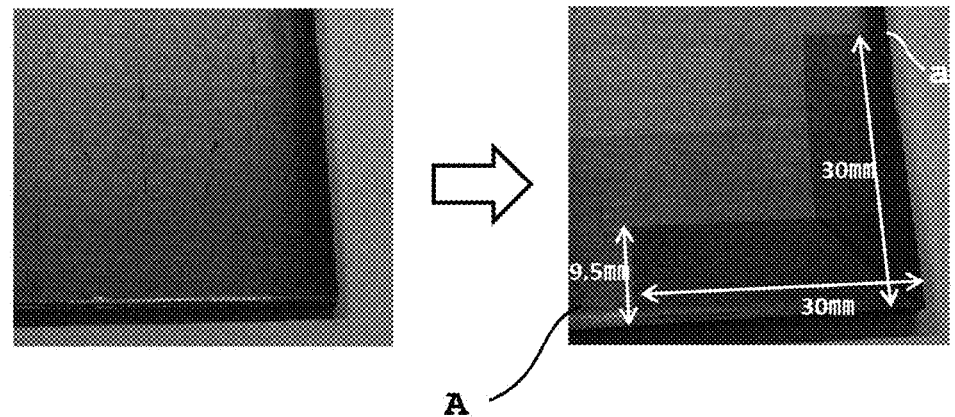
FIG. 3 is a photograph for showing an evaluation sample A to be subjected to the evaluations of an adhesive shift and liquid penetration in Examples.

(5) Evaluation of Adhesive Shift of Pressure-Sensitive Adhesive Tape for Battery Outer Packaging A pressure-sensitive adhesive tape for a battery outer packaging was wound around the entirety of a stainless-steel plate (thickness: 1 mm, width: 125 mm, length: 50 mm). Further, in each of the four corner portions of the stainless-steel plate around which the pressure-sensitive adhesive tape for a battery outer packaging had been wound, another pressure-sensitive adhesive tape for a battery outer packaging (length: 60 mm, width: 20 mm) was bonded in a bent manner as shown in FIG. 3. Thus, an evaluation sample A was produced.

Next, the evaluation sample A was mounted on a PET film (thickness: 100 µm, width: 125 mm, length: 50 mm, weight: 0.875 g) so that its four sides coincided with those of the film.

Next, a 1-kilogram weight was mounted on the evaluation sample, and the whole was left to stand at 23° C. for 24 hours.

Next, the weight was removed, and a laminate of the evaluation sample A and the PET film was vertically stood. The degree of the peeling of the PET film was observed 1 hour after the standing.

When the PET film peeled and fell, the evaluation sample was evaluated as being free of any adhesive shift (the sample was represented as "○" in Table 1). Meanwhile, when the PET film did not fall, the evaluation sample was evaluated as causing an adhesive shift (exposing its pressure-sensitive adhesive layer) (the sample was represented as "×" in Table 1).

(6) Evaluation of Liquid Penetration of Pressure-Sensitive Adhesive Tape for Battery Outer Packaging The evaluation sample A produced in the evaluation (5) was left to stand at 23° C. for 24 hours, and was then immersed in water colored with a dye. After the sample had been left to stand at 23° C. for 24 hours while being immersed therein, the presence or absence of the penetration of the liquid into its pressure-sensitive adhesive tape portion for a battery outer packaging was confirmed, and a liquid penetration distance from an end portion of the tape (end portion a of FIG. 3) was measured.

Example 1

A mixture obtained by mixing 95 parts of 2-ethylhexyl acrylate (2EHA), 4 parts of acrylic acid (AA), 0.1 part of azobisisobutyronitrile, and 100 parts of ethyl acetate was polymerized under a nitrogen atmosphere at 60° C. for 6 hours to provide abase polymer (A) having a weight-average molecular weight of 1,200,000.

100 Parts by weight of the base polymer (A), 1 part by weight of a cross-linking agent (trifunctional isocyanate-based compound, manufactured by Tosoh Corporation, product name: "CORONATE L"), and 20 parts by weight of a tackifier (terpene phenol, manufactured by Sumitomo Bakelite Co., Ltd., product name: "SUMILITE RESIN PR12603", softening point: 133° C.) were mixed to prepare a pressure-sensitive adhesive A.

The pressure-sensitive adhesive A was applied to a polyethylene terephthalate base material (thickness: 23 µm). Thus, a pressure-sensitive adhesive tape for a battery outer packaging including the base material (thickness: 23 µm) and a pressure-sensitive adhesive layer (thickness: 27 µm) was obtained.

The resultant pressure-sensitive adhesive tape for a battery outer packaging was subjected to the evaluations (1) to (6). The results are shown in Table 1.

Example 2

A mixture obtained by mixing 95 parts of 2-ethylhexyl acrylate (2EHA), 7 parts of acrylic acid (AA), 0.1 part of azobisisobutyronitrile, and 100 parts of ethyl acetate was polymerized under a nitrogen atmosphere at 60° C. for 6 hours to provide abase polymer (B) having a weight-average molecular weight of 1,200,000.

100 Parts by weight of the base polymer (B), 1 part by weight of a cross-linking agent (trifunctional isocyanate-based compound, manufactured by Tosoh Corporation, product name: "CORONATE L"), and 10 parts by weight of a tackifier (terpene phenol, manufactured by Sumitomo Bakelite Co., Ltd., product name: "SUMILITE RESIN PR12603", softening point: 133° C.) were mixed to prepare a pressure-sensitive adhesive B.

The pressure-sensitive adhesive B was applied to a polyethylene terephthalate base material (thickness: 50 µm). Thus, a pressure-sensitive adhesive tape for a battery outer packaging including the base material (thickness: 50 µm) and a pressure-sensitive adhesive layer (thickness: 27 µm) was obtained.

The resultant pressure-sensitive adhesive tape for a battery outer packaging was subjected to the evaluations (1) to (6). The results are shown in Table 1.

Example 3

A mixture obtained by mixing 95 parts of butyl acrylate (BA), 6 parts of acrylic acid (AA), 0.1 part of azobisisobutyronitrile, and 100 parts of ethyl acetate was polymerized under a nitrogen atmosphere at 60° C. for 6 hours to provide a base polymer (C) having a weight-average molecular weight of 1,200,000.

100 Parts by weight of the base polymer (C) and 3 parts by weight of a cross-linking agent (trifunctional isocyanate-based compound, manufactured by Tosoh Corporation, product name: "CORONATE L") were mixed to prepare a pressure-sensitive adhesive C.

The pressure-sensitive adhesive C was applied to a polyethylene terephthalate base material (thickness: 23 µm). Thus, a pressure-sensitive adhesive tape for a battery outer packaging including the base material (thickness: 23 µm) and a pressure-sensitive adhesive layer (thickness: 27 µm) was obtained.

The resultant pressure-sensitive adhesive tape for a battery outer packaging was subjected to the evaluations (1) to (6). The results are shown in Table 1.

Example 4

A pressure-sensitive adhesive tape for a battery outer packaging (base material: 25 µm, pressure-sensitive adhesive layer: 27 µm) was obtained in the same manner as in Example 3 except that the base polymer (B) was used instead of the base polymer (C). The resultant pressure-sensitive adhesive tape for a battery outer packaging was subjected to the evaluations (1) to (6). The results are shown in Table 1.

Example 5

The base polymer (A) was obtained in the same manner as in Example 1.

100 Parts by weight of the base polymer (A), 2 parts by weight of a cross-linking agent (trifunctional isocyanate-based compound, manufactured by Tosoh Corporation, product name: "CORONATE L"), and 20 parts by weight of a tackifier (rosin-modified ester, manufactured by Harima Chemicals, Inc., product name: "HARIESTER KT-3", softening point: 185° C.) were mixed to prepare a pressure-sensitive adhesive D.

The pressure-sensitive adhesive D was applied to a biaxially stretched polypropylene film (OPP) base material (thickness: 20 µm). Thus, a pressure-sensitive adhesive tape for a battery outer packaging including the base material (thickness: 20 µm) and a pressure-sensitive adhesive layer (thickness: 20 µm) was obtained.

The resultant pressure-sensitive adhesive tape for a battery outer packaging was subjected to the evaluations (1) to (6). The results are shown in Table 1.

Example 6

A pressure-sensitive adhesive tape for a battery outer packaging (base material: 16 µm, pressure-sensitive adhesive layer: 19 µm) was obtained in the same manner as in Example 5 except that: a polyphenylene sulfide (PPS) base material (thickness: 16 µm) was used instead of the biaxially stretched polyphenylene film base material (thickness: 20 µm); and the thickness of the pressure-sensitive adhesive layer was changed to 19 µm.

The resultant pressure-sensitive adhesive tape for a battery outer packaging was subjected to the evaluations (1) to (6). The results are shown in Table 1.

Example 7

The base polymer (A) was obtained in the same manner as in Example 1.

100 Parts by weight of the base polymer (A) and 1 part by weight of a cross-linking agent (trifunctional isocyanate-based compound, manufactured by Tosoh Corporation, product name: "CORONATE L") were mixed to prepare a pressure-sensitive adhesive E.

The pressure-sensitive adhesive E was applied to a polyimide (PI) base material (thickness: 25 µm). Thus, a pressure-sensitive adhesive tape for a battery outer packaging including the base material (thickness: 25 µm) and a pressure-sensitive adhesive layer (thickness: 27 µm) was obtained.

The resultant pressure-sensitive adhesive tape for a battery outer packaging was subjected to the evaluations (1) to (6). The results are shown in Table 1.

Example 8

The base polymer (A) was obtained in the same manner as in Example 1.

100 Parts by weight of the base polymer (A), 2 parts by weight of a cross-linking agent (trifunctional isocyanate-based compound, manufactured by Tosoh Corporation, product name: "CORONATE L"), and 20 parts by weight of a tackifier (terpene phenol, manufactured by Sumitomo Bakelite Co., Ltd., product name: "SUMILITE RESIN PR12603", softening point: 133° C.) were mixed to prepare a pressure-sensitive adhesive F.

The pressure-sensitive adhesive F was applied to a polyethylene terephthalate base material (thickness: 100 µm). Thus, a pressure-sensitive adhesive tape for a battery outer packaging including the base material (thickness: 100 µm) and a pressure-sensitive adhesive layer (thickness: 27 µm) was obtained.

The resultant pressure-sensitive adhesive tape for a battery outer packaging was subjected to the evaluations (1) to (6). The results are shown in Table 1.

Example 9

A pressure-sensitive adhesive tape for a battery outer packaging was obtained in the same manner as in Example 6 except that the back surface (side where the pressure-sensitive adhesive layer was not arranged) of the polyphenylene sulfide base material was subjected to a surface treatment.

The surface treatment was performed by applying a toluene solution (0.02 wt %) of polyvinyl octadecyl carbamate (manufactured by Hodogaya Chemical Co., Ltd., product name: "HSW-H1") in an application amount of 50 g/m$^2$.

The resultant pressure-sensitive adhesive tape for a battery outer packaging was subjected to the evaluations (1) to (6). The results are shown in Table 1.

Example 10

A pressure-sensitive adhesive tape for a battery outer packaging was obtained in the same manner as in Example 9 except that the concentration of the toluene solution of the polyvinyl octadecyl carbamate (manufactured by Hodogaya Chemical Co., Ltd., product name: "HSW-H1") was changed to 0.4 wt %. The resultant pressure-sensitive adhesive tape for a battery outer packaging was subjected to the evaluations (1) to (6). The results are shown in Table 1.

Example 11

A mixture obtained by mixing 95 parts of 2-ethylhexyl acrylate (2EHA), 12 parts of acrylic acid (AA), 0.1 part of azobisisobutyronitrile, and 100 parts of ethyl acetate was polymerized under a nitrogen atmosphere at 60° C. for 6 hours to provide abase polymer (D) having a weight-average molecular weight of 1,200,000.

100 Parts by weight of the base polymer (D) and 1 part by weight of a cross-linking agent (trifunctional isocyanate-based compound, manufactured by Tosoh Corporation, product name: "CORONATE L") were mixed to prepare a pressure-sensitive adhesive G.

The pressure-sensitive adhesive G was applied to a polyethylene terephthalate base material (thickness: 23 μm). Thus, a pressure-sensitive adhesive tape for a battery outer packaging including the base material (thickness: 23 μm) and a pressure-sensitive adhesive layer (thickness: 27 μm) was obtained.

The resultant pressure-sensitive adhesive tape for a battery outer packaging was subjected to the evaluations (1) to (6). The results are shown in Table 1.

Example 12

100 Parts by weight of toluene, 100 parts by weight of a tackifier (reactive alkylphenol formaldehyde resin, manufactured by Taoka Chemical Co., Ltd., product name: "TACKIROL 201"), 5 parts by weight of magnesium oxide (manufactured by Kyowa Chemical Industry Co., Ltd., product name: "KYOWAMAG 30"), and 2 parts by weight of distilled water were stirred and mixed. After a lapse of 24 hours, a supernatant (rubber reaction liquid) was collected.

100 Parts by weight of pale crepe (polyisoprene), 50 parts by weight of a terpene resin (manufactured by Yasuhara Chemical Co., Ltd., product name: "YS RESIN PX1000"), 1 part by weight of an antioxidant (manufactured by BASF Japan Ltd., product name: "IRGANOX 1010"), and 50 parts by weight of the rubber reaction liquid were mixed to provide a rubber-based pressure-sensitive adhesive.

The rubber-based pressure-sensitive adhesive was applied to a polyethylene terephthalate base material (thickness: 23 μm). Thus, a pressure-sensitive adhesive tape for a battery outer packaging including the base material (thickness: 23 μm) and a pressure-sensitive adhesive layer (thickness: 27 μm) was obtained.

The resultant pressure-sensitive adhesive tape for a battery outer packaging was subjected to the evaluations (1) to (6). The results are shown in Table 1.

Comparative Example 1

A mixture obtained by mixing 80 parts of ethyl acrylate (EA), 20 parts of 2-ethylhexyl acrylate (2EHA), 7 parts of 2-hydroxyethyl acrylate (HEA), 1 part of acrylic acid (AA), 0.1 part of azobisisobutyronitrile, and 100 parts of ethyl acetate was polymerized under a nitrogen atmosphere at 60° C. for 6 hours to provide abase polymer (E) having a weight-average molecular weight of 1,200,000.

100 Parts by weight of the base polymer (E) and 2 parts by weight of a cross-linking agent (trifunctional isocyanate-based compound, manufactured by Tosoh Corporation, product name: "CORONATE L") were mixed to prepare a pressure-sensitive adhesive H.

The pressure-sensitive adhesive H was applied to a polyethylene terephthalate base material (thickness: 23 μm). Thus, a pressure-sensitive adhesive tape for a battery outer packaging including the base material (thickness: 23 μm) and a pressure-sensitive adhesive layer (thickness: 27 μm) was obtained.

The resultant pressure-sensitive adhesive tape for a battery outer packaging was subjected to the evaluations (1) to (6). The results are shown in Table 1.

Comparative Example 2

The base polymer (D) was obtained in the same manner as in Example 11.

100 Parts by weight of the base polymer (D), 2 parts by weight of a cross-linking agent (trifunctional isocyanate-based compound, manufactured by Tosoh Corporation, product name: "CORONATE L"), and 40 parts by weight of a tackifier (terpene phenol, manufactured by Sumitomo Bakelite Co., Ltd., product name: "SUMILITE RESIN PR12603", softening point: 133° C.) were mixed to prepare a pressure-sensitive adhesive I.

The pressure-sensitive adhesive I was applied to a polyethylene terephthalate base material (thickness: 23 μm). Thus, a pressure-sensitive adhesive tape for a battery outer packaging including the base material (thickness: 23 μm) and a pressure-sensitive adhesive layer (thickness: 27 μm) was obtained.

The resultant pressure-sensitive adhesive tape for a battery outer packaging was subjected to the evaluations (1) to (6). The results are shown in Table 1.

Comparative Example 3

The base polymer (A) was obtained in the same manner as in Example 1.

100 Parts by weight of the base polymer (A), 0.5 part by weight of a cross-linking agent (trifunctional isocyanate-based compound, manufactured by Tosoh Corporation, product name: "CORONATE L"), and 20 parts by weight of a tackifier (alicyclic saturated hydrocarbon, manufactured by Arakawa Chemical Industries, Ltd., product name: "ARKON P-90", softening point: 90° C.) were mixed to prepare a pressure-sensitive adhesive J.

The pressure-sensitive adhesive J was applied to a polyethylene terephthalate base material (thickness: 23 μm). Thus, a pressure-sensitive adhesive tape for a battery outer packaging including the base material (thickness: 23 μm) and a pressure-sensitive adhesive layer (thickness: 27 μm) was obtained.

The resultant pressure-sensitive adhesive tape for a battery outer packaging was subjected to the evaluations (1) to (6). The results are shown in Table 1.

TABLE 1

| | | Example 1 | Example 2 | Example 3 | Example 4 | Example 5 | Example 6 | Example 7 | Example 8 | Example 9 | Example 10 | Example 11 | Comparative Example 1 | Comparative Example 2 | Comparative Example 3 | Example 12 |
|---|---|---|---|---|---|---|---|---|---|---|---|---|---|---|---|---|
| Pressure-sensitive adhesive layer | Base polymer | Base polymer A (2EHA/AA = 95/4) | 100 | | | | 100 | 100 | 100 | 100 | 100 | 100 | | | 100 | | |
| | | Base polymer B (2EHA/AA = 95/7) | | 100 | | | | | | | | | | | | | |
| | | Base polymer C (2EHA/AA = 95/12) | | | 100 | | | | | | | | | | | | |
| | | Base polymer D (BA/AA = 95/6) | | | | 100 | | | | | | | 100 | | | | |
| | | Base polymer E (EA/2EHA/HEA/AA = 80/20/7/1) | | | | | | | | | | | | 100 | | | |
| | Cross-linking agent | CORONATE L (trifunctional isocyanate-based compound) | 1 | 1 | 3 | 3 | 2 | 2 | 1 | 2 | 2 | 2 | 1 | 2 | 2 | 0.5 | |
| | Tackifier | HARIESTER KT-3 (rosin-modified ester) | 20 | 10 | 18 | | 20 | | | | | | | | | | |
| | | SUMILITE RESIN PR12603 (terpene phenol) | | | | | | 20 | | 20 | 20 | 20 | | | 40 | 20 | |
| | | ARKON P-90 (alicyclic saturated hydrocarbon) | | | | | | | 0.75 | | | | | | | | 1.5 |
| | Loss modulus of elasticity (G″) of pressure-sensitive adhesive layer at 70° C. (× 10³ Pa) | | 11 | 126 | 18 | 38 | 12 | 12 | 8.4 | 13 | 11.9 | 11.9 | 20 | 20.8 | 105 | 5.5 | 0.91 |
| | Loss modulus of elasticity (G″) of pressure-sensitive adhesive layer at 70° C. (× 10⁴ Pa) | | 0.77 | 1.4 | 1.34 | 2.39 | 0.87 | 0.87 | 0.57 | 0.89 | 0.89 | 0.87 | 1.4 | 1.77 | 3.5 | 0.37 | 8.3 |
| | Storage modulus of elasticity (G′) of pressure-sensitive adhesive layer at 23° C. (× 10⁵ Pa) | | 1.4 | 2.3 | 3.9 | 10.4 | 2.07 | 2.07 | 2 | 1.5 | 2.07 | 2.07 | 4 | 18.9 | 4.15 | 0.9 | |
| | Storage modulus of elasticity (G′) of pressure-sensitive adhesive layer at 100° C. (× 10⁴ Pa) | | | | | | | | | | | | | | | | |
| Base material | Thickness (μm) | | 27 | 27 | 27 | 27 | 20 | 19 | 27 | 27 | 19 | 19 | 27 | 27 | 27 | 27 | 27 |
| | Kind | | PET | PET | PET | PET | OPP | PPS | PI | PET | PPS | PPS | PET | PET | PET | PET | PET |
| | Modulus of elasticity (× 10⁹ Pa) | | 4 | 50 | 4 | 4 | 20 | 16 | 25 | 100 | 16 | 16 | 23 | 23 | 23 | 23 | 23 |
| | Modulus of elasticity of base material × thickness (× 10⁸ mm · Pa) | | 1 | 2 | 1 | 1 | 3.9 | 4.2 | 3 | 4 | 4.2 | 4.2 | 4 | 4 | 4 | 4 | 4 |
| | | | | | | | 0.78 | 0.67 | 0.75 | | 0.67 | 0.67 | 1 | 1 | 1 | 1 | 1 |
| | Back surface treatment | | Absent | Absent | Absent | Absent | Absent | Absent | Absent | Absent | Present (0.02%) | Present (0.4%) | Absent | Absent | Absent | Absent | Absent |
| Pressure-sensitive adhesive strength to stainless-steel plate (N/10 mm) | | | 5.8 | 4 | 5.5 | 3.2 | 2.2 | 2.7 | 2.2 | 6 | 2.7 | 2.7 | 4.3 | 1.7 | 1.5 | 6.8 | 5.3 |
| Self-back surface pressure-sensitive adhesive strength (N/10 mm) | | | 4.5 | 3.1 | 3.38 | 2.5 | 1.1 | 2.1 | 1.5 | 4.2 | 1.4 | 0.8 | 3.5 | 0.9 | 0.9 | 5.5 | 3.9 |
| Adhesive shift | | | ○ | ○ | ○ | ○ | ○ | ○ | ○ | ○ | ○ | ○ | ○ | ○ | ○ | × | ○ |
| Liquid penetration | | | 0 mm | 0 mm | 0 mm | 0 mm | 0 mm | 0 mm | 0 mm | 1 mm | 0 mm | 1 mm | 1 mm | 4 mm | 7 mm | 0 mm | 0 mm |

What is claimed is:

1. A battery outer packaging pressure-sensitive adhesive tape, comprising:
    a base material having a tensile modulus of elasticity at 23° C. is from $0.5 \times 10^9$ Pa to $10 \times 10^9$ Pa; and
    a pressure-sensitive adhesive layer arranged on one surface of the base material,
    wherein:
    the pressure-sensitive adhesive layer contains an acrylic polymer as a base polymer,
    the acrylic polymer contains a constituent unit derived from a (meth)acrylic acid alkyl ester having 4 to 8 carbon atoms and a constituent unit derived from a monomer having an acidic functional group, wherein the monomer having the acidic functional group is a carboxyl group-containing monomer,
    a content ratio of the monomer having the acidic functional group is from 3 parts by weight to 8 parts by weight with respect to 100 parts by weight of the acrylic polymer,
    the pressure-sensitive adhesive tape has a self-back surface pressure-sensitive adhesive strength at 23° C. of 1 N/10 mm or more;
    a value calculated from an expression "a loss modulus of elasticity (G") of the pressure-sensitive adhesive tape for a battery outer packaging at 70° C.× a thickness (mm) of the pressure-sensitive adhesive layer/a thickness (mm) of the pressure-sensitive adhesive tape for a battery outer packaging" is $8 \times 10^3$ Pa or more;
    a value calculated from an expression "a storage modulus of elasticity (G') of the pressure-sensitive adhesive tape for a battery outer packaging at 23° C.× the thickness (mm) of the pressure-sensitive adhesive layer/the thickness (mm) of the pressure-sensitive adhesive tape for a battery outer packaging" is $3 \times 10^5$ Pa or less;
    a pressure-sensitive adhesive strength of the pressure-sensitive adhesive tape for a battery outer packaging to a stainless-steel plate at 23° C. is 2 N/10 mm or more; and
    a product of the tensile modulus of elasticity of the base material at 23° C. and a thickness of the base material is $4 \times 10^8$ Pa·mm or less.

2. The battery outer packaging pressure-sensitive adhesive tape according to claim 1, wherein a value calculated from an expression "a loss modulus of elasticity (G") of the pressure-sensitive adhesive tape for a battery outer packaging at 70° C.× a thickness (mm) of the pressure-sensitive adhesive layer/a thickness (mm) of the pressure-sensitive adhesive tape for a battery outer packaging" is from $8.3 \times 10^3$ Pa to $40 \times 10^3$ Pa.

3. The battery outer packaging pressure-sensitive adhesive tape according to claim 1, wherein a value calculated from an expression "a storage modulus of elasticity (G') of the pressure-sensitive adhesive tape for a battery outer packaging at 23° C.× the thickness (mm) of the pressure-sensitive adhesive layer/the thickness (mm) of the pressure-sensitive adhesive tape for a battery outer packaging" is from $0.5 \times 10^5$ Pa to $2.5 \times 10^5$ Pa.

4. The battery outer packaging pressure-sensitive adhesive tape according to claim 1, wherein a value calculated from an expression "a storage modulus of elasticity (G') of the pressure-sensitive adhesive tape for a battery outer packaging at 100° C.× the thickness (mm) of the pressure-sensitive adhesive layer/the thickness (mm) of the pressure-sensitive adhesive tape for a battery outer packaging" is from $1 \times 10^4$ Pa to $15 \times 10^4$ Pa.

5. The battery outer packaging pressure-sensitive adhesive tape according to claim 1, wherein the acrylic polymer contains a constituent unit derived from (meth)acrylic acid alkyl ester having a branched alkyl group.

6. The battery outer packaging pressure-sensitive adhesive tape according to claim 5, wherein a content ratio of a constituent unit derived from the (meth)acrylic acid alkyl ester having a branched alkyl group in the base polymer is from 50 parts by weight to 100 parts by weight with respect to 100 parts by weight of the constituent unit derived from the (meth)acrylic acid alkyl ester.

* * * * *